United States Patent
Edge et al.

(10) Patent No.: US 9,474,012 B2
(45) Date of Patent: Oct. 18, 2016

(54) FOCUSED ASSISTANCE DATA FOR WIFI ACCESS POINTS AND FEMTOCELLS

(71) Applicant: QUALCOMM Incorporated, San Diego, CA (US)

(72) Inventors: Stephen William Edge, Escondido, CA (US); Andreas Klaus Wachter, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 13/828,835

(22) Filed: Mar. 14, 2013

(65) Prior Publication Data

US 2014/0235280 A1    Aug. 21, 2014

Related U.S. Application Data

(60) Provisional application No. 61/765,713, filed on Feb. 16, 2013.

(51) Int. Cl.
*H04W 48/16* (2009.01)
*G01S 5/02* (2010.01)

(52) U.S. Cl.
CPC ............ *H04W 48/16* (2013.01); *G01S 5/0236* (2013.01); *Y02B 60/50* (2013.01)

(58) Field of Classification Search
CPC ..... H04W 4/02; H04W 48/16; H04W 64/00; H04L 29/08657; G01S 5/00; G01S 5/0236; Y02B 60/50
USPC ................................... 455/440, 456.1–456.6
See application file for complete search history.

(56) References Cited

U.S. PATENT DOCUMENTS

| | | |
|---|---|---|
| 2003/0050078 A1 | 3/2003 | Motegi et al. |
| 2006/0092883 A1* | 5/2006 | Lee et al. ................. 370/332 |
| 2006/0240840 A1 | 10/2006 | Morgan et al. |
| 2007/0066334 A1 | 3/2007 | Butts et al. |
| 2008/0064404 A1* | 3/2008 | Zhang et al. ............. 455/436 |
| 2008/0081636 A1* | 4/2008 | Nylander et al. ......... 455/452.2 |
| 2008/0176583 A1 | 7/2008 | Brachet et al. |
| 2009/0042574 A1 | 2/2009 | Jung et al. |
| 2009/0280775 A1 | 11/2009 | Moeglein et al. |
| 2010/0278141 A1* | 11/2010 | Choi-Grogan et al. ..... 370/331 |
| 2011/0039576 A1* | 2/2011 | Prakash et al. ........... 455/456.1 |
| 2011/0237268 A1* | 9/2011 | Tsuda .......................... 455/450 |
| 2012/0129559 A1* | 5/2012 | Pochop, Jr. ................. 455/507 |
| 2012/0309420 A1* | 12/2012 | Morgan et al. ........... 455/456.1 |
| 2014/0235266 A1 | 8/2014 | Edge et al. |

FOREIGN PATENT DOCUMENTS

WO    2011019917 A1    2/2011

OTHER PUBLICATIONS

Taiwan Search Report—TW103104951—TIPO—Dec. 30, 2014.

* cited by examiner

*Primary Examiner* — Dinh P Nguyen
(74) *Attorney, Agent, or Firm* — Silicon Valley Patent Group LLP (57) ABSTRACT

Systems, apparatus and methods for reducing a long list of access points (APs) to a short list of access points are presented. Advantageously, a mobile device only need to search for access points on the short list thereby more quickly discovering access points, saving battery power, determining a position fix based on the discovered access points, and reducing a time to fix. Embodiments enable a mobile device to determine which access points should be detectable at a new location of the mobile device. Various embodiments comprise: (1) a linked database; (2) a grouped database; (3) an associated database; and (4) database feedback.

21 Claims, 7 Drawing Sheets

FOCUSED ASSISTANCE DATA FOR WIFI ACCESS POINTS AND FEMTOCELLS

CROSS-REFERENCE TO RELATED APPLICATIONS

This application claims the benefit of and priority under 35 U.S.C. §119(e) to U.S. Provisional Application No. 61/765,713, filed Feb. 16, 2013, entitled "Focused assistance data for WiFi access points and femtocells," and which is assigned to the assignee hereof and incorporated herein by reference in its entirely.

BACKGROUND

I. Field of the Invention

This disclosure relates generally to systems, apparatus and methods for position location of a mobile device, and more particularly to narrowing a list of access points based on a rough position, thereby more quickly detecting visible access points, which leads to a faster time-to-first position fix.

II. Background

Positioning support for location based on WiFi and Femtocell measurements by a mobile device 100 is defined in the OMA LPPe positioning protocol (e.g., other widely used positioning protocols like LPP, RRLP, RRC, IS-801 do not contain support for WiFi centric positioning and only allow Femtocell centric positioning without special enhancement). As background, reference is made to the following definitions, acronyms and abbreviations:

TABLE 1

| | |
|---|---|
| 3GPP | 3rd Generation Partnership Project |
| AD | Assistance Data |
| AP | Access Point |
| IEEE | Institute of Electrical and Electronics Engineers |
| LAI | location area identifier |
| LPP | LTE Positioning Protocol |
| LTE | 3GPP Long Term Evolution |
| MS | Mobile Station |
| OMA | Open Mobile Alliance |
| OMA LPPe | OMA LPP Extensions |
| OWT | One-way Time |
| RF | Radio Frequency |
| RSSI | Received Signal Strength Indication |
| RTT | Round-trip Time |
| SLP | Service Location Protocol |
| SUPL | Secure User Plane Location |
| UE | User Equipment |
| WiFi product | any WLAN product based on the IEEE 802.11 family of standards |
| WLAN | Wireless Local Area Network |

A problem with current support for WiFi and Femtocell centric positioning in LPPe is that assistance data (AD) for WiFi access points and Femtocells provides a potentially large number of access points in the assistance data. The large number of access points in the assistance data is not refined or filtered specific to a rough position of a particular mobile device. That is, the assistance data for the large number of access points is independent of which access points are more likely to be receivable or beneficial to positioning of the mobile device. For example, a large building or other structure (e.g., an office building, a shopping mall, an airport, a municipal center or an enterprise building) may contain a large number (e.g., hundreds) of access points that may be communicated to a mobile device via an assistance data message. In one example, a location server (e.g., a SUPL SLP) provides to the mobile device a large number of access points within an assistance data message.

Typically, at any location within a building or structure, a mobile device will only be able to receive and measure signals from some small fraction of this large number of access points. However, unless the mobile device 100 already has an accurate location estimate and can therefore determine (e.g., from provided access point (AP) location coordinates) which access points are nearest to it, it will not generally know which access points it will be able to detect and measure. Additionally, even when a mobile device does determine which access points are nearby, the presence of walls, floors and corridors in a building may mean that some nearby access points may not be detectable whereas other access points further away may be detectable due to good radio propagation conditions (e.g., such as that provided by an access point at the far end of a long corridor).

What is needed is a way to reduce a large access point list to a more relevant and shorter access point list for acquiring access point signals from which a position fix of a mobile device may be determined.

BRIEF SUMMARY

Disclosed are systems, apparatus and methods for narrowing a search list of access points based on a rough position. A mobile station applies the shortened list to its access point search algorithm to more quickly find available access points. Once the access points are detected, the mobile device or network may uses signals communicated between these access points and mobile device to determine a position fix, thereby reducing a time-to-first fix and improving location accuracy.

According to some aspects, disclosed is a method in a mobile device for determining a position fix in a wireless network, the method comprising: determining a rough position; receiving, at the mobile device, a database from a location server, wherein the database is based on the rough position, wherein the database lists a first set of access points associated with the rough position, and wherein the database comprises at least one of a linked database, a grouped database, or an associated database; and discovering a second set of access points based on the first set of access points.

According to some aspects, disclosed is a mobile device for determining a position fix in a wireless network, the mobile device comprising: a wireless transceiver configured to receive a database from a location server, wherein the database is based on a rough position, wherein the database lists a first set of access points associated with the rough position, and wherein the database comprises at least one of a linked database, a grouped database, or an associated database; and a processor coupled to the wireless transceiver and configured to determine the rough position and configured to discover a second set of access points based on the first set of access points.

According to some aspects, disclosed is a mobile device for determining a position fix in a wireless network, the mobile device comprising: means for determining a rough position; means for receiving, at the mobile device, a database from a location server, wherein the database is based on the rough position, wherein the database lists a first set of access points associated with the rough position, wherein the database comprises at least one of a linked database, a grouped database, or an associated database; and means for discovering a second set of access points based on the first set of access points.

According to some aspects, disclosed is a non-transitory computer-readable storage medium including program code stored thereon for a mobile device to determine a position fix in a wireless network, the non-transitory computer-readable storage medium comprising program code to: determine a rough position; receive, at the mobile device, a database from a location server, wherein the database is based on the rough position, wherein the database lists a first set of access points associated with the rough position, and wherein the database comprises at least one of a linked database, a grouped database, or an associated database; and discover a second set of access points based on the first set of access points.

According to some aspects, disclosed is a method in a location server for determining a position fix of a mobile device in a wireless network, the method comprising: receiving, from the mobile device, a rough position; determining a database based on the rough position; and sending, to the mobile device, the database; wherein the database comprises one of a linked database, a grouped database, or an associated database.

According to some aspects, disclosed is a location server for determining a position fix of a mobile device in a wireless network, the location server comprising: means for receiving, from the mobile device, a rough position; means for determining a database based on the rough position; and means for sending, to the mobile device, the database; wherein the database comprises one of a linked database, a grouped database, or an associated database.

According to some aspects, disclosed is a location server for determining a position fix of a mobile device in a wireless network, the location server comprising: a transceiver configured to receive, from the mobile device, a rough position; and send, to the mobile device, a database; and a processor coupled to the transceiver and configured to determining the database based on the rough position, wherein the database comprises at least one of a linked database, a grouped database, or an associated database.

According to some aspects, disclosed is a non-transitory computer-readable storage medium including program code stored thereon for a location server to determine a position fix of a mobile device in a wireless network, the non-transitory computer-readable storage medium comprising program code to: receive, from the mobile device, a rough position; determine a database based on the rough position; and send to the mobile device, the database; wherein the database comprises one of a linked database, a grouped database, or an associated database.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

Figure 1:
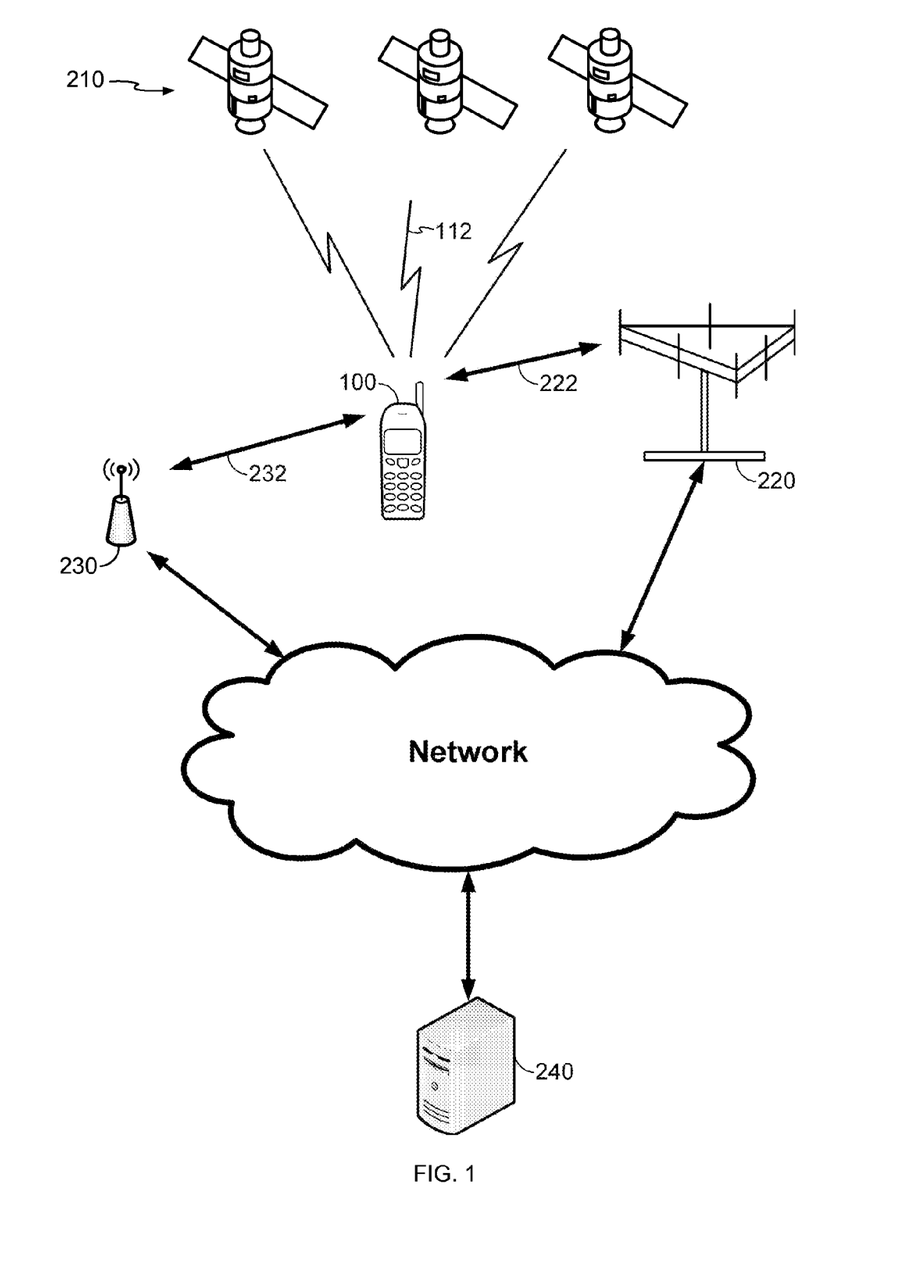
FIG. 1 shows a mobile device and its components, in accordance with some embodiments of the present invention.

FIG. 1 shows a system including a mobile device 100, GNSS satellites 210, a macrocell 220, an access point 230, and a location server 240, in accordance with some embodiments of the present invention. The mobile device 100 receives signals 112 from GNSS satellites 210. The signals 112 may be used to compute a position fix. The mobile device 100 also communicates with the macrocell 220 using signals 222 and with the access point 230 using signals 232. In addition, the mobile device 100 may communicate with the location server 240 through a network, such as the Internet or a private network, via either the macrocell 220 or the access point 230.

Figure 2A:
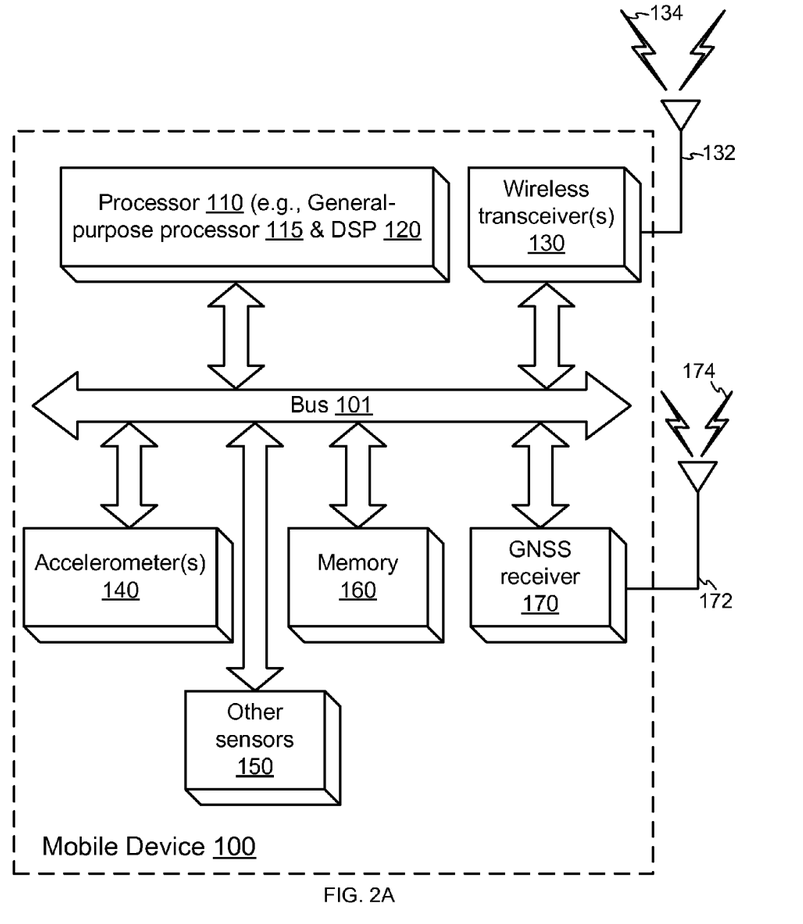
FIGS. 2A and 2B show a system including a mobile device, GNSS satellites, an access point, a macrocell and a location server, in accordance with some embodiments of the present invention.
Figure 2B:
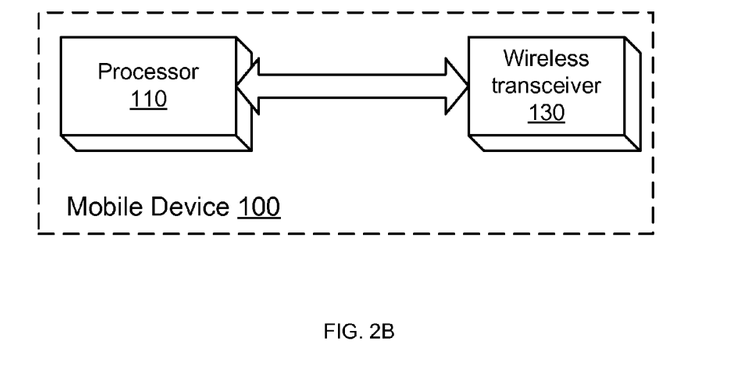

FIGS. 2A and 2B show a mobile device 100 and its components, in accordance with some embodiments of the present invention. In FIG. 2A, the mobile device 100 includes a processor 110 (e.g., a general-purpose processor 115 and/or a digital signal processor (DSP 120)), one or more wireless transceivers 130 electrically connected to an antenna 132 to communicate signals 134, one or more accelerometers 140, other sensors 150 (e.g., a gyrometer and/or a barometer), memory 160 and a GNSS receiver 170 electrically connected to an antenna 172 to receive signals 174. These components may be coupled together with bus 101 (as shown), directed connected together, or a combination of both. The memory 160 may contain executable code or software instructions for the processor 110 to perform methods described herein.

In FIG. 2B, a mobile device 100 contains processor 110 and a wireless transceiver 130. The wireless transceiver 130 is configured to receive a database from a location server. The database is based on a rough position and lists a first set of access points associated with the rough position. The database also includes at least one of a linked database, a grouped database or an associated database described below. The processor 110 is coupled to the wireless transceiver and configured to determine the rough position and configured to discover a second set of access points based on the first set of access points.

Knowing which access points 230 should be detectable and measured may assist and speed up signal acquisition. A location server 240 indicates to a mobile device 100 (e.g., via assistance data provided) just access points 230 using different frequencies, channels and/or radio technologies. The assistance data may also enable a mobile device 100 to determine when to stop looking for access points listed and when to start looking for additional access points. As an example of the latter, if a mobile device 100 "knew" that at some location, six access points should be detectable, it might continue looking for more access points after detecting just two or three access points, however, it might decide to stop looking after detecting five or six access points. LPPe currently does not provide support for such improved WiFi access point and Femtocell acquisition.

As an example of a wireless system, the present disclosure focuses on LPPe. Embodiments of the present invention may equally apply to other wireless systems. Embodiments may enable a mobile device 100 to determine which access points 230 should be detectable when at a new location. Various embodiments provide one or more of the following inventive concepts: (1) a linked database; (2) a grouped database; (3) an associated database; and (4) database feedback. Individual access points may be identified by an access identifier, SSID and/or a MAC address and may include additional information for the access point 230 such as antenna tilt. Embodiments may be limited to indoor environments or may also include outdoor environments.

Linked Database

In the first embodiment, a linked database is disclosed. Assistance data contains links between access points. That is, a linked database, supplied in an assistance data message (or supplied a priori), provides links between access points 230 based on rough position or visibility. The structure of the linked database indicates which access points 230 should be visible given that certain other access points 230 are already known to be visible. A link from a first access point 230 to a second access point 230 indicates the second access point 230 is often visible from an RF scan when the first access point 230 is visible. The first access point 230 may have links to several nearby access points 230 that are generally visible whenever the first access point 230 is visible. Generally, a linked database shows a mobile device 100 receiving a signal from the first access point 230 can also receive a signal from access points 230 linked to the first access point 230.

Therefore, access points 230 directly linked together may be received by a mobile device 100 at a set location. Links may be unidirectional or bidirectional. Therefore, links need not be symmetric, for example, due to differing relative coverage area sizes for different access points 230 For example, assume a first access point 230 has a relatively small coverage area and a second access point 230 has a relatively large coverage area that encompasses the first access point. Also assume the first access point 230 is currently viewable by a mobile device 100. In this case, the database provides a unidirectional link from the first access point 230 to the second access point 230, but the second access point 230 might not be linked to the first access point 230 if the first access point is rarely seen.

In some embodiments, a relevant portion of a linked database is sent to the mobile device 100. In some embodiments, a linked database may contain links that are symmetrical (e.g., a single link joins together two access points 230). In some embodiments, a linked database may contain links that are asymmetrical (e.g., a single link joins a first access point 230 to a second access point 230 but not vice versa). In some embodiments, a linked database is sent to a mobile device 100 before it is needed or requested. In these embodiments, only a portion of the linked database may be used. In other embodiments, the linked database is sent by a location server 240 and may be pared down by the location server 240. In some embodiments, linkages between access points 230 may be defined by including the access points 230 in a common set or group, in which case all access points 230 within the same set may be considered to be bi-directionally linked to one another.

Figure 3:
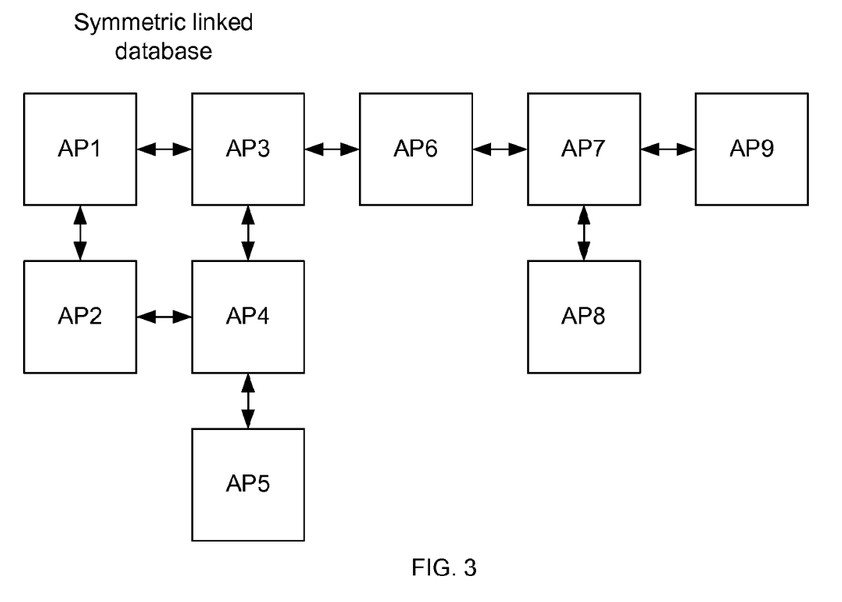
FIGS. 3 and 4 show a database of linked access points, in accordance with some embodiments of the present invention.
Figure 4:
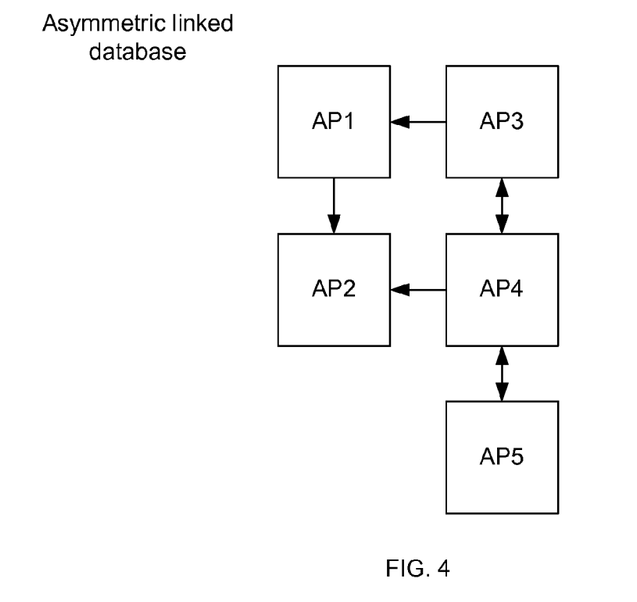

FIGS. 3 and 4 show a database of linked access points 230, in accordance with some embodiments of the present invention. In FIG. 3, a linked database is shown symmetric where each link represents a bidirectional link. For example, AP3 indicates it is linked to AP1, AP4 and AP6. A mobile device 100 may limit its search to these access points 230 when located in AP3. Similarly, AP4 is linked to AP2, AP3 and AP5. When the coverage area of AP4 or when AP4 is probably visible, AP2, AP3 and AP5 are probably also visible. AP6 is linked to AP3 and AP6. AP7 is linked to AP5, AP8 and AP9. AP8 and AP9 are just linked to AP7. Each of the links between access points 230 are bidirectional links.

In FIG. 4, a linked database is asymmetric. AP1 can usually detect AP2 but not AP3. AP2 can detect both AP1 and AP4. AP3 can only detect AP4. AP4 can detect signals from AP3 and AP5. AP5 only detects signal from AP4. AP1 and AP3 are shown having an asymmetric or uni-directional link. For example, when in a coverage area of AP3, the linked database shows AP1 and AP4 are probably visible too. However, when in a coverage area for AP1, signals from AP3 are probably not visible. This asymmetry occurs when AP1 has a large coverage area and AP3 has a small coverage area.

Grouped Database

In the second embodiment, a grouped database is disclosed. A grouped database contains groupings of access points that are generally visible or are generally useful at one location. For example, the grouped database associates a plurality of access points predicted to have signals receivable (e.g., from a rough position). One group may be provided for each area of an indoor location. For example, an area may comprise a floor of a building, a location area having a location area identifier (LAI), or a wing of a building. Estimating a position location may be most useful from access points 230 on a common floor of a building. The rough position of a mobile device 100 may be determined by the strongest or closest access point. That is, a best access point may indicate a location area or a grouping of access points 230. Assistance data may focus on just the access points 230 belonging to a particular location area (e.g., access points 230 having the same or a common LAI). The access point information may indicate a particular floor or wing of a building. For example, if a rough position of the mobile device 100 is on a second floor (e.g., from the strongest access point 230 being on the second floor), a group of access points 230 for just that second floor may be provided to the mobile device 100 in an assistance data message. Access points from a common floor may be more likely to have signals that are received and provide a better position fix than access points from different floors (e.g., the vertically closest access points but of different floors may be less likely to be received and less useful in finding a position fix). In some cases, the assistance data message provided to the mobile device 100 may contain a group of access points 230 for the current rough position. In other cases, the assistance data message provided to the mobile device 100 may also contain immediate neighboring groups (e.g., neighboring floors, wings or buildings having a common LAI).

A mobile device 100 may determine when to stop using one group of access points for location measurements and start using another group of access points based on recent relative movement. Consider the case when a mobile device 100 is able to detect and measure access points in a Group A associated with floor N in a building. The mobile device 100 then detects (e.g., using internal inertial or barometric sensors) that it has moved up by n floors. The mobile device 100 may determine that it should look for and measure access points in a different (say group B) that are associated with an area on floor N+n of the building. The internal sensors used may include a barometer indicating altitude change, an accelerometer used in dead reckoning, or a signal strength (e.g., RSSI) or signal travel time (e.g., OWT or RTT) that indicates all access points 230 in a current group are becoming too distant.

Alternative, a location server 240 may determine the mobile device 100 has moved to a different area and may send an updated assistance data message containing a new group of access points 230. If various groups of access points 230 have already been downloaded to the mobile device 100, the location server 240 only needs to send an indicator of a group of access points 230. Alternatively, the mobile device 100 may start again with a new request for assistance data. In the previous example, the location server 240 may initially send assistance data to the mobile device 100 where the assistance data contains Group A access points 230. The mobile device 100 then moves to another floor or different area represented by a different LAI. The server may then send assistance data containing Group B access points to the mobile device 100. Alternatively, the location server 240 sends neighboring groups of access points 230 in anticipation the mobile device 100 may move from one group to another group.

Figure 5:
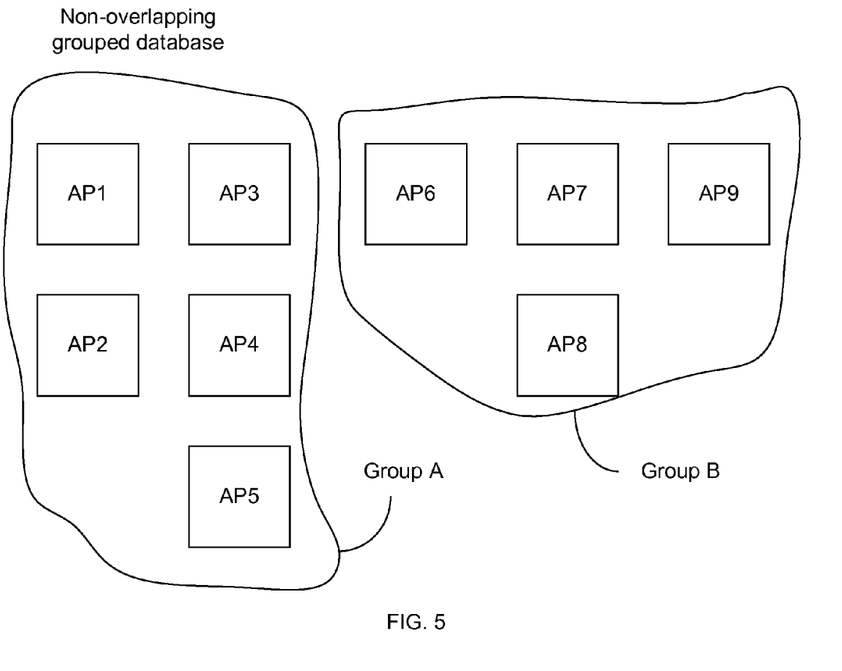
FIG. 5 shows a database with grouped access point, in accordance with some embodiments of the present invention.

FIG. 5 shows a database with grouped access point, in accordance with some embodiments of the present invention. The location server 240 contains a database showing AP1-AP5 in Group A and AP6-AP9 in group B. The database has Groups A and B as non-overlapping groups. A grouped database may be overlapping or non-overlapping. In a non-overlapping grouped database, an access point 230 is exclusively in only one group. In an overlapping grouped database (not shown), an access point may belong to one, two or more groups. For example, the grouped database includes overlapping groups, wherein an access point is found in at least two groups.

Associated Database

In the third embodiment, an associated database or a macrocell-to-access point association is disclosed. A macrocell, such as a mobile radio cell from a GSM, CDMA, LTE, or the like, is associated with the one or more access points visible from a position with the coverage area of that macrocell. In some embodiments, only access points visible from indoor locations and also having coverage of a particular macrocell are provided in an associated database for assistance data.

Figure 6:
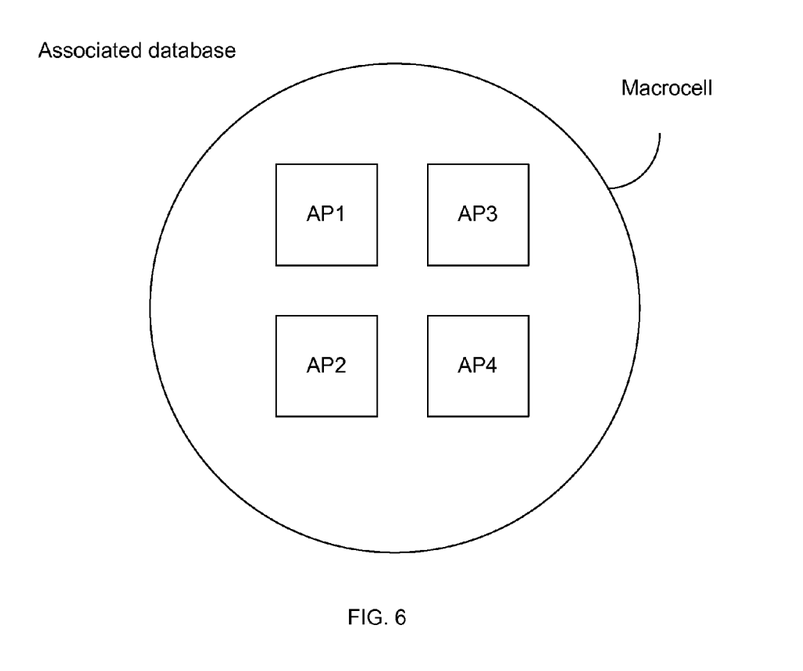
FIG. 6 shows a database that associates a macrocell to access points, in accordance with some embodiments of the present invention.

FIG. 6 shows a database that associates a macrocell to access points, in accordance with some embodiments of the present invention. In an associated database, a macrocell is used to indicate a set of access points 230. Again, the access points 230 may be overlapping (such that two macrocells indicate a common access point 230) or non-overlapping (such that an access point 230 is associated with only one macrocell). With an associated database, a rough position may be given as falling within the coverage area of a particular macrocell. The mobile device 100 provides an identity of the macrocell as its rough position. In response, the location server 240 may provide one or more access points 230 (e.g., AP1-AP4) in an assistance data response to the mobile device 100.

Database Feedback

In the fourth embodiment, database feedback is disclosed. In response to assistance data from a server, over-inclusive (at least one unused) and/or under-inclusive (missing) access points 230 are fed back from the mobile device 100 to the location server 240.

The feedback information may include an over-inclusive list of one or more access points 230 contained in assistance data but not seen by the mobile device 100 (after attempting to find those listed access points 230). The location server 240 may use this feedback information to remove access points 230 from a linked database, a grouped database or an associated database. For example, if a threshold number of mobile devices 100 tell a location server 240 that a particular access point 230 is not visible even though its listed in the assistance data, then that particular access point 230 may be removed from the database (e.g., a link removed, removed from a group, or unassociated from a macrocell).

On the other hand, the feedback information may include an under-inclusive list of one or more access points 230 not contained in assistance data but seen by the mobile device 100. The server may use this feedback information to add an access point to a linked database, a grouped database or an associated database. For example, if a threshold number of mobile devices 100 tell a location server 240 that a particular access point 230 is visible but not listed in the assistance data, then that particular access point 230 may be added (e.g., a link added, added to a group, associated with a particular macrocell).

As such, one or more mobile devices 100 may be used to make a database residing on a location server 240 more accurate for future requesting assistance data from various mobile devices 100. A mobile device 100 may report undetectable and/or missing access point either automatically at the end of a session or when polled by a server. In addition, the mobile device 100 may include an indication of its current position.

Figure 7:
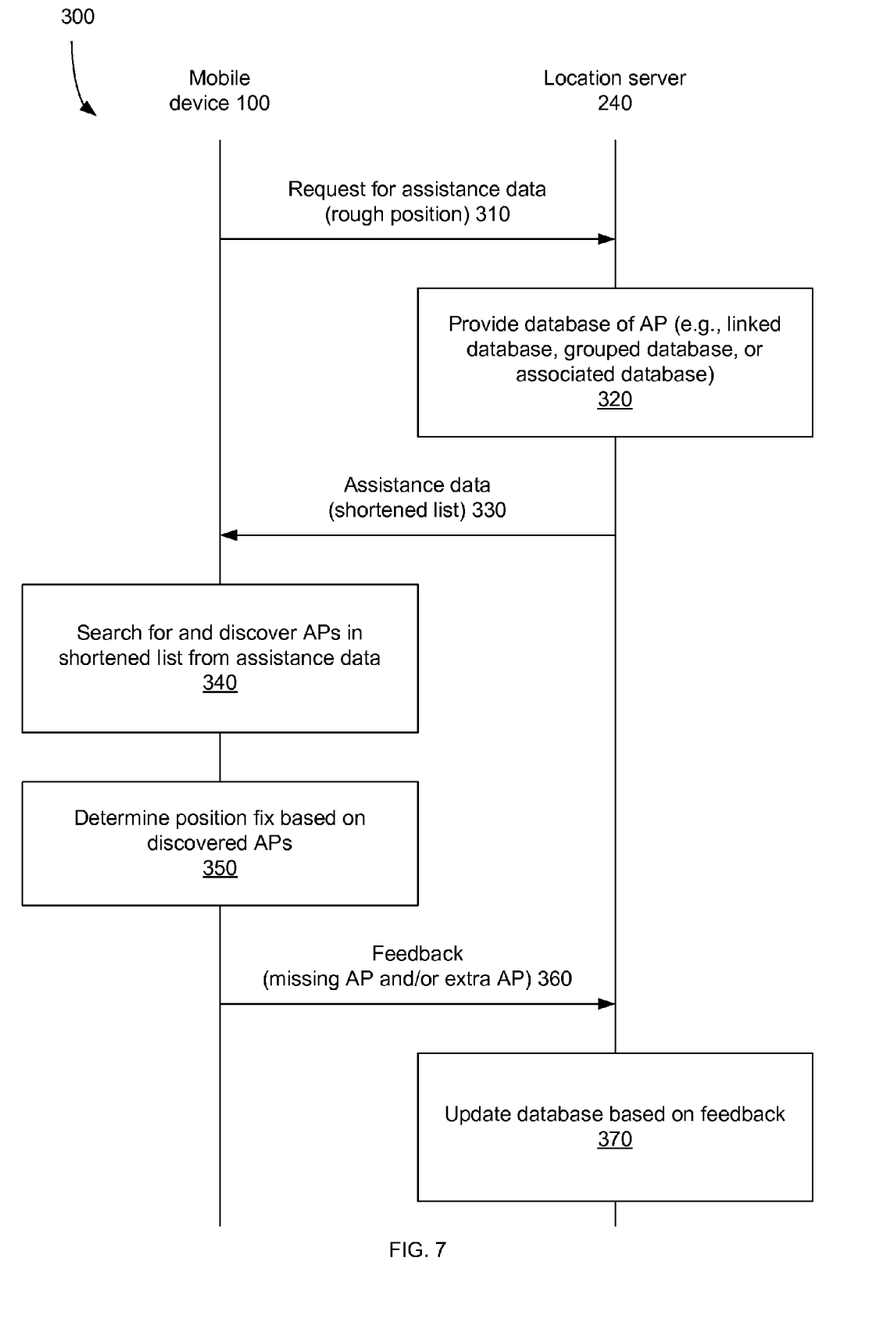
FIG. 7 shows messaging between a mobile device and a location server, in accordance with some embodiments of the present invention.

FIG. 7 shows a method 300 of messaging between a mobile device 100 and a location server 240, in accordance with some embodiments of the present invention. To receive assistance data, a mobile device 100 sends a location server 240 a request 310 for assistance data. At 320, the location server 240 may pare down a larger database to a smaller database or shortened list based on a rough position of the mobile device 100 to form a first plurality of access points. For example, the location server 240 may compile assistance data for just access points associated with a particular rough position rather than access points 230 known to be unviewable by the mobile device 100 from its current rough position. The location server 240, based on the rough position, sends the mobile device 100 the shortened list as assistance data 330.

At 340, the mobile device 100 searched for and discovers access points 230 in the shortened list from the assistance data 330. At 350, based on the discovered access points, the mobile device 100 (mobile-based location determination) or both the mobile device 100 and location server (network-assisted location determination) determine a position fix for the mobile device 100.

Some access points 230 in the shortened list may be undiscoverable and therefore the shortened list was over inclusive. Some access points 230 discovered may not be in the shortened list and therefore the shortened list was under inclusive. In some embodiments, the mobile device 100 sends the location server 240 feedback 360 containing adjustments to the shortened list. For example, the mobile device 100 may send the location server a list of access points missing from the shortened list that should have been in the shortened list and/or extra access points in the shortened list that should not have been in the shortened list. At 370, the location server 240 may adjust the shortened list or the database by adding to or removing from the shortened list or the database after receiving a threshold number of reports regarding a particular access point 230.

Figure 8:
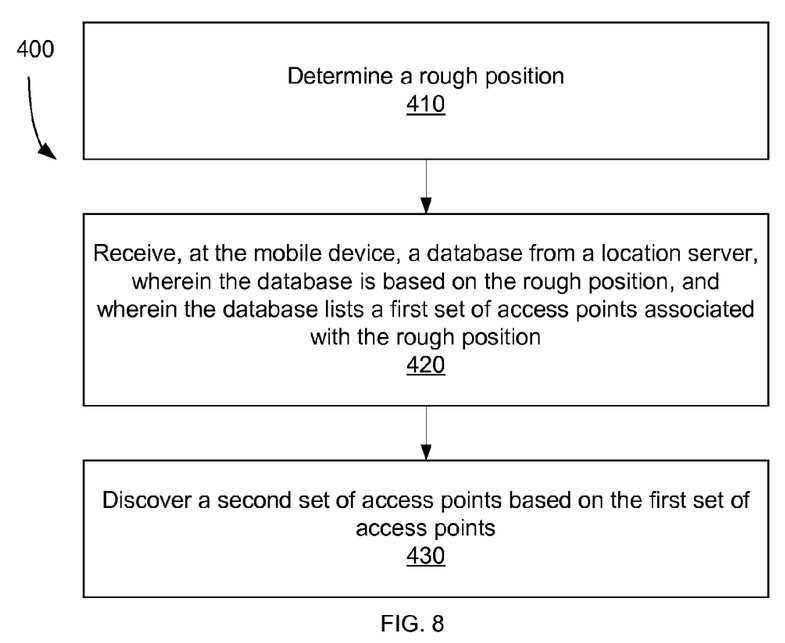
FIGS. 8 and 9 show methods, in accordance with some embodiments of the present invention.
Figure 9:
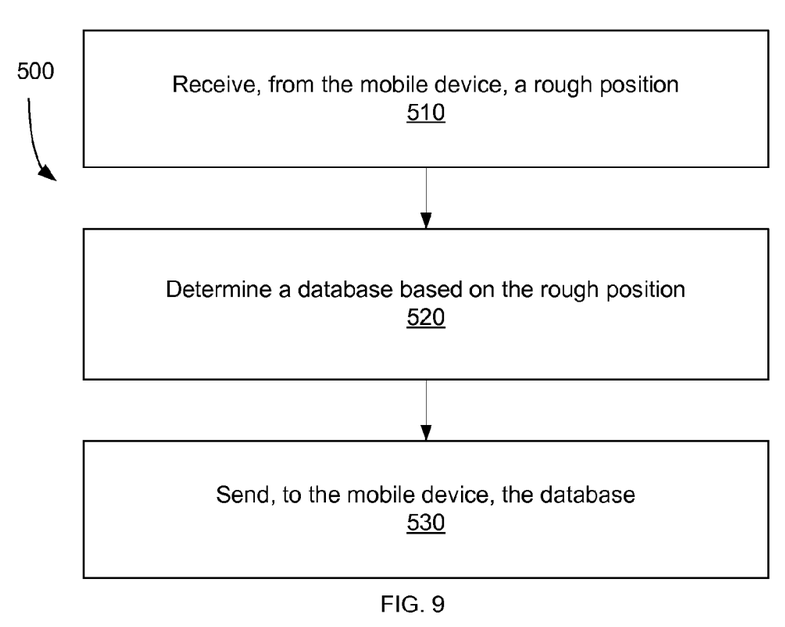

FIGS. 8 and 9 show methods 400 and 500, in accordance with some embodiments of the present invention. In FIG. 8, a method 400 is shown for a mobile device to determine a position fix in a wireless network. At 410, the mobile device determines a rough position. The rough position may be determined by a wireless transceiver, a GNSS receiver, a processor or the like in the mobile device. For example, the rough position may be a Cell ID, from triangulation or trilateration, or a position fix with a large uncertainty above a threshold. At 420, a wireless transceiver in the mobile device receives a database from a location server. The database is based on the rough position. Also, the database lists a first set of access points associated with the rough position. At 430, the wireless transceiver and/or the processor in the mobile device discovers a second set of access points based on the first set of access points. The database comprises at least one of a linked database, a grouped database, or an associated database.

In FIG. 9, a method 500 in a location server determines a database for a position fix of a mobile device in a wireless network. At 510, a transceiver in the location server receives, from the mobile device, a rough position. At 520, a processor in the location server determines a database based on the rough position. At 530, the transceiver in the location server sends, to the mobile device, the database. Again, the database includes one of a linked database, a grouped database, or an associated database.

Figure 10:
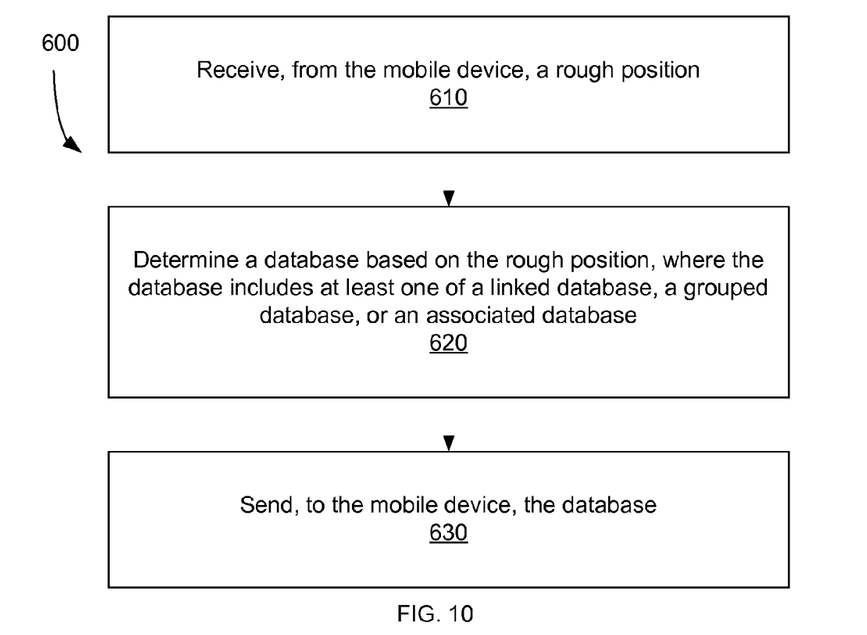
FIGS. 10 and 11 show a location server, in accordance with some embodiments of the present invention.

FIGS. 10 and 11 show a location server, in accordance with some embodiments of the present invention. In FIG. 10, a method 600 is shown for a location server helping a mobile device to determine a position fix of the mobile device in a wireless network. At 610, a transceiver in the location server receives, from the mobile device, a rough position. At 620, a processor in the location server determines a database based on the rough position. At 630, the transceiver sends, to the mobile device, the database. The database includes at least one of a linked database, a grouped database, or an associated database.

Figure 11:
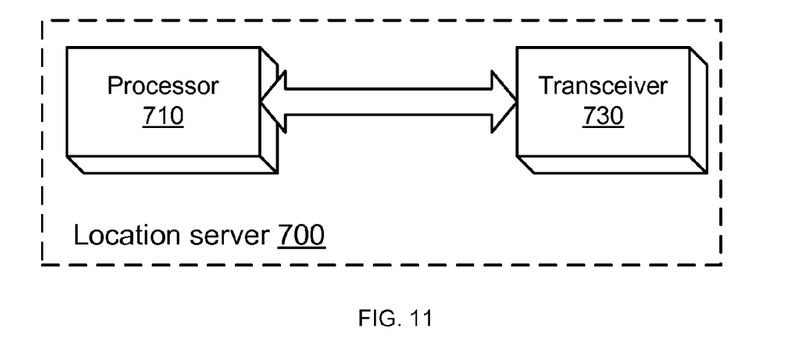

In FIG. 11, a location server is shown for determining a position fix of a mobile device in a wireless network. The location server includes a processor 710 and a transceiver 730. The transceiver 730 is configured to receive, from the mobile device, a rough position. The transceiver 730 is also configured to send, to the mobile device, a database. The database includes at least one of a linked database, a grouped database, or an associated database. The processor 710 is coupled to the transceiver 730 and configured to determining the database based on the rough position.

Rough Position

Assistance data may be based on a rough position of the mobile device 100. Rough position may be determined from triangulation or trilateration from signal strength measurements of signals with certain access points 230 and/or timing (e.g., OWT or RTT) between the mobile device 100 and access points 230. Rough position may correspond to coverage area of a macrocell or of an access point. A strongest access point may be used to indicate a group or location area or may be used to find access points linked to the strongest access point. Instead of receiving a large list of access points from a server or searching a large list of access points indexed on a mobile device 100, the mobile device 100 may target a shorter list of access points 230 thereby saving mobile device 100 battery usage and improve a time to fix.

Rough position may be indicated by one or more received signal strength indicators. Rough position may be indicated by a time-difference of arrival (TDA) from two or more synchronized base stations (such as with LTE base stations) and the mobile device 100. Rough position may be associated with a particular macrocell.

Not only may rough position be indicated by signals with access points 230 and macrocells, a rough position may be determined from a short range signal (such as a Bluetooth signal) or an extremely long range signal (such as a GNSS signal). For example, a Bluetooth signal may be correlated to a group of access points usually visible when the Bluetooth signal is visible. Rough position may be indicated by what GNSS are visible at a particular time. Rough position may have been highly accurate but a passing of time has left the highly accurate fix less accurate. Rough position may be associated with a highly accurate fix with subsequent dead reckoning that may have drifted with time.

A rough position may be determined by a mobile device. For example, a GNSS receiver, signals from a sensor or a wireless transceiver may determine at rough position. For example, signals from an inertial sensor may be fed to a dead reckoning unit to provide a rough position. A rough position may be determined by a wireless network. For example, rough position may be determined by a wireless network by which macrocell is providing service to a particular mobile device 100.

In the above examples, access point where used. In these examples, an access point may be replace a femtocell to provide additional embodiments.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a mobile device for determining a position fix in a wireless network, the method comprising:
   determining a first position fix of the mobile device;
   receiving, at the mobile device, a linked database from a location server, wherein the linked database is in response to the first position fix of the mobile device, comprising a first set of access points associated with the first position fix of the mobile device, and wherein the linked database provides links associating access points in the first set of access points with corresponding sets of access points, wherein an at least one link to a corresponding set of access points indicates access points that are visible, for determining a second position fix, utilizing at least one radio frequency (RF) scan conducted in a coverage area of an associated access point in the first set of access points;
   searching for access points in the first set of access points utilizing at least one radio frequency (RF) scan conducted in the coverage area of a first access point in the first set of access points; and
   discovering for position determination a second set of access points based on the first access point that is visible and the at least one link between the first access point and the corresponding set of access points associated with the first access point provided in the linked database, and wherein the second position fix for the mobile device is determined using the second set of access points.

2. The method of claim 1, wherein the linked database comprises a bidirectional link between the first access point and a second access point in the corresponding set of access points associated with the first access point.

3. The method of claim 1, wherein the linked database comprises a one-way link between the first access point and a second access point in the corresponding set of access points associated with the first access point.

4. The method of claim 1, wherein the first set of access points comprises access points on a common floor of a building.

5. The method of claim 1, wherein the first set of access points belongs to a common location area identifier (LAI).

6. The method of claim 1, wherein the first position fix of the mobile device is indicated by a macrocell.

7. The method of claim 1, wherein the second position fix of the mobile device is determined by the mobile device.

8. The method of claim 1, wherein the second position fix of the mobile device is determined by the wireless network.

9. The method of claim 1, wherein the first position fix of the mobile device corresponds to the coverage area of a macrocell.

10. The method of claim 1, wherein the first position fix of the mobile device corresponds to the coverage area of an access point.

11. The method of claim 1, further comprising determining the second position fix exclusively based on access points that are in the second set of access points.

12. The method of claim 1, wherein there is a difference between the second set of access points and the corresponding set of access points associated with the first access point, the method further comprising sending feedback information to the location server, wherein the feedback information contains an adjustment to be made to the first set of access points based on the difference.

13. The method of claim 12, wherein the difference is at least one access point in the corresponding set of access points associated with the first access point that is not in the second set of access points.

14. The method of claim 12, wherein the difference is at least one access point in the second set of access points that is not in the corresponding set of access points associated with the first access point.

15. A mobile device for determining a position fix in a wireless network, the mobile device comprising:
   a wireless transceiver configured to receive a linked database from a location server, wherein the linked database is in response to a first position fix of the mobile device, comprising a first set of access points associated with the first position fix of the mobile device, and wherein the linked database provides links associating access points in-the first set of access points with corresponding sets of access points, wherein an at least one link to a corresponding set of access points indicates access points that are visible, for determining a second position fix, utilizing at least one radio frequency (RF) scan conducted in a coverage area of an associated access point in the first set of access points; and
   a processor coupled to the wireless transceiver and configured to determine the second position fix of the mobile device and configured to search for access points in the first set of access points utilizing at least one radio frequency (RF) scan conducted in the coverage area of a first access point in the first set of access points, and discover for position determination a second set of access points based on the first access point that is visible and the at least one link between the first access point and the corresponding set of access points associated with the first access point provided in the linked database, and wherein the second position fix for the mobile device is determined using the second set of access points.

16. The mobile device of claim 15, wherein there is a difference between the second set of access points and the corresponding set of access points associated with the first access point, wherein the wireless transceiver is further configured to send feedback information to the location server, wherein the feedback information contains an adjustment to be made to the first set of access points based on the difference.

17. The mobile device of claim 16, wherein the difference is at least one access point in the corresponding set of access points associated with the first access point that is not in the second set of access points.

18. The mobile device of claim 16, wherein the difference is at least one access point in the second set of access points that is not in the corresponding set of access points associated with the first access point.

19. A mobile device for determining a position fix in a wireless network, the mobile device comprising:

means for determining a first position fix of the mobile device;

means for receiving, at the mobile device, a linked database from a location server, wherein the linked database is in response to the first position fix of the mobile device, comprising a first set of access points associated with the first position fix of the mobile device, wherein the linked database provides links associating access points in the first set of access points with corresponding sets of access points, wherein an at least one link to a corresponding set of access points indicates access points that are visible, for determining a second position fix, utilizing at least one radio frequency (RF) scan conducted in a coverage area of an associated access point in the first set of access points; and means for searching for access points in the first set of access points utilizing at least one radio frequency (RF) scan conducted in the coverage area of a first access point in the first set of access points; and means for discovering for position determination a second set of access points based on the first access point that is visible and the at least one link between the first access point and the corresponding set of access points associated with the first access point provided in the linked database, and wherein the second position fix for the mobile device is determined using the second set of access points.

20. The mobile device of claim 19, wherein the first position fix of the mobile device is indicated by a macrocell.

21. A non-transitory computer-readable storage medium including program code stored thereon for a mobile device to determine a position fix in a wireless network, the non-transitory computer-readable storage medium comprising program code to:

determine a first position fix of the mobile device;

receive, at the mobile device, a linked database from a location server, wherein the linked database is in response to the first position fix of the mobile device, comprising a first set of access points associated with the first position fix of the mobile device, and wherein the linked database provides links associating access points in the first set of access points with corresponding sets of access points, wherein an at least one link to a corresponding set of access points indicates access points that are visible, for determining a second position fix, utilizing at least one radio frequency (RF) scan conducted in a coverage area of an associated access point in the first set of access points; and search for access points in the first set of access points utilizing at least one radio frequency (RF) scan conducted in the coverage area of a first access point in the first set of access points; and discover for position determination a second set of access points based on the first access point that is visible and the at least one link between the first access point and the corresponding set of access points associated with the first access point provided in the linked database, and wherein the second position fix for the mobile device is determined using the second set of access points.

\* \* \* \* \*